United States Patent
Sastry

(10) Patent No.: US 11,099,974 B2
(45) Date of Patent: Aug. 24, 2021

(54) COGNITIVE ANALYTICS FOR HIGH-AVAILABILITY APPLICATION-PERFORMANCE MANAGEMENT

(71) Applicant: INTERNATIONAL BUSINESS MACHINES CORPORATION, Armonk, NY (US)

(72) Inventor: Shashidhar Sastry, Pune (IN)

(73) Assignee: International Business Machines Corporation, Armonk, NY (US)

(*) Notice: Subject to any disclaimer, the term of this patent is extended or adjusted under 35 U.S.C. 154(b) by 82 days.

(21) Appl. No.: 16/420,968

(22) Filed: May 23, 2019

(65) Prior Publication Data

US 2020/0371901 A1    Nov. 26, 2020

(51) Int. Cl.
*G06F 9/44* (2018.01)
*G06F 11/36* (2006.01)
(Continued)

(52) U.S. Cl.
CPC ........ *G06F 11/3684* (2013.01); *G06F 11/008* (2013.01); *G06F 11/302* (2013.01);
(Continued)

(58) Field of Classification Search
CPC ............... G06F 11/3684; G06F 11/008; G06F 11/3006; G06F 11/302; G06F 11/3409;
(Continued)

(56) References Cited

U.S. PATENT DOCUMENTS 6,959,433 B1  10/2005  Morales, Jr.
7,020,803 B2   3/2006  Wolin
(Continued)

FOREIGN PATENT DOCUMENTS

CN    102231681 A    11/2011
CN    102354298 A     2/2012

OTHER PUBLICATIONS

Ahmadivala, Morteza; A Simulation Based Approach for Reliability Evaluation and Optimization of Time-Dependent Systems: A Case Study of Production Systems (Barin Plast Company); Thesis submitted to the Graduate School of Natural and Applied Sciences in partial fulfillment for the degree of Master of Science in Industrial and Systems Engineering; Apr. 2016; 90 pages.

(Continued)

*Primary Examiner* — Chat C Do
*Assistant Examiner* — Lenin Paulino
(74) *Attorney, Agent, or Firm* — Schmeiser, Olsen & Watts; Michael A. Petrocelli

(57) ABSTRACT

An application-performance management (APM) system manages the performance of a service on a highly redundant high-availability platform that configures duplicate instances of hardware, software, or infrastructure components. The APM system verifies the resilience of the platform by conducting a series of tests that each measure the performance of platform components while simulating a failure path comprising one or more distinct combinations of component failures. If the service is not highly critical, the APM system simulates single-failure failure paths, but more critical services are tested by simulating multiple concurrent failures. Self-learning cognitive modules of the APM system select the failure paths to be tested and then infer from the measurements which failure paths present an unacceptably high risk of service outage. The APM system then directs downstream systems to revise the architecture to mitigate any such risks.

17 Claims, 9 Drawing Sheets

(51) Int. Cl.
  *G06F 11/00* (2006.01)
  *G06F 11/30* (2006.01)
  *G06F 11/34* (2006.01)
(52) U.S. Cl.
  CPC ...... *G06F 11/3006* (2013.01); *G06F 11/3409* (2013.01); *G06F 11/368* (2013.01); *G06F 11/3612* (2013.01); *G06F 11/3692* (2013.01)
(58) Field of Classification Search
  CPC . G06F 11/3612; G06F 11/368; G06F 11/3692
  See application file for complete search history.

(56) References Cited

U.S. PATENT DOCUMENTS

| | | | |
|---|---|---|---|
| 7,165,189 | B1 | 1/2007 | Lakkapragada |
| 7,770,063 | B2 | 8/2010 | Robertson |
| 9,032,373 | B1 | 5/2015 | Gupta |
| 2002/0188904 | A1* | 12/2002 | Chen .............. G01R 31/318342 714/741 |
| 2003/0131285 | A1 | 7/2003 | Beardsley |
| 2014/0036913 | A1* | 2/2014 | Olofsson ............. H04L 12/1868 370/390 |
| 2019/0104047 | A1* | 4/2019 | Tejaprakash ............ H04L 41/22 |
| 2019/0213104 | A1* | 7/2019 | Qadri ...................... G06F 21/12 |
| 2020/0104774 | A1* | 4/2020 | Sun ..................... H04L 41/5067 |
| 2020/0133814 | A1* | 4/2020 | Prabath ............... G06F 11/0772 |

OTHER PUBLICATIONS

Anonymous; Method and System for Automatically Testing High Availability (HA) Failover Procedure in Virtualization Based Environment; IP.com; IPCOM000204796d; Mar. 10, 2011; 3 pages.

Carrera, Alvaro et al.; A real-life application of multi-agent systems for fault diagnosis in the provision of an Internet business service; Journal of Network and Computer Applications; vol. 37; Jan. 2014; pp. 146-154.

Kaaniche, M. et al.; Multi-level modeling approach for the availability assessment of e-business applications; Journal of Software: Practice and Experience; vol. 33, Issue 14; Nov. 25, 2003; 28 pages.

Mariano, Carlos Henrique et al.; Simulation Optimization Approach to Solve a Complex Multi-objective Redundancy Allocation Problem; Applied Simulation and Optimization; Apr. 7, 2015; pp. 39-73.

Micskei, Zoltan et al.; Robustness Testing Techniques for High Availability Middleware Solutions; Proceedings of International Workshop on Engineering of Fault Tolerant Systems; 2006; 12 pages.

Oner, K. B. et al.; Redundancy optimization for critical components in high-availability capital goods; (BETA publicatie : working papers; vol. 341). Eindhoven: Technische Universiteit Eindhoven; 2011; 41 pages.

Rao, M. Srinivasa et al.; Reliability analysis of repairable systems using system dynamics modeling and simulation; J. Ind. Eng. Int (2014); Jul. 24, 2014; 10 pages.

Rao, Meesala Srinivasa et al.; Review of Simulation Approaches in Reliability and Availability Modeling; International Journal of Performability Engineering; vol. 12, No. 4; Jul. 2016; pp. 369-388.

Roberts, Woodrow Thomas Jr.; Failure Predictions in Repairable Multi-Component Systems; LSU Historical Dissertations and Theses; 1992; 116 pages.

Sharkh, Mohamed Abu et al.; Simulating High Availability Scenarios in Cloud Data Centers: A Closer Look; 2015 IEEE 7th International Conference on Cloud Computing Technology and Science (CloudCom); Nov. 30-Dec. 3, 2015; 7 pages.

* cited by examiner

COGNITIVE ANALYTICS FOR HIGH-AVAILABILITY APPLICATION-PERFORMANCE MANAGEMENT

BACKGROUND

The present invention relates in general to application-performance management (APM) and relates in particular to managing application performance in a high-availability environment by using intelligent testing methodologies based on cognitive analytics.

Application-performance management technology monitors and manages the overall performance and availability of software applications, computerized systems, and operating environments. APM systems detect, and sometimes attempt to diagnose, performance issues in order to ensure that an application or system is able to reliably maintain its expected level of service.

Cloud-based hosting services and other types of computerized service providers offer "high-availability," minimal-downtime, operating environments and hosting services for critical applications. One way that high-availability APM technologies try to reduce downtime is by configuring redundant hardware, software, middleware, and network infrastructure.

Known APM systems may continuously monitor fluctuating workloads and response times of a system, application, or infrastructure component. From this information, the system attempts to detect the occurrence of performance issues that require correction. Known APM systems may not be able to determine the cause of such issues and thus cannot automatically resolve a detected problem.

This occurs because known APM systems simply monitor a system or application as a black box, tracking only its high-level inputs and outputs, such as its overall workload, response times, or throughput. Current APM technology does not attempt more nuanced testing that accounts for dependencies or simultaneous failures of multiple components or internal component layers, such as application, middleware, operating system, and hardware layers.

In particular, current APM technology is generally unable to determine whether the performance of one hardware or software component has been compromised by the failure of another component, or if one layer of a multi-layer vertical system has failed because a lower layer of the same vertical system has failed.

For example, an APM system that detects unacceptably high database query-response times would not know whether the problem is caused by a failure of a dedicated SQL server, by a lack of available space on a network-attached database-storage device, by an unexpected termination of a user-interface or middleware service, or by a network failure. And, even if an APM system were to be configured to also test these other components, the system could not determine if that other component is the ultimate source of the problem.

Similarly, an APM system that monitors both a DBMS application and its SQL server might determine that the server, not the database software, is the source of database performance problem. But the system could not determine the underlying cause of the server failure because the APM system does not independently monitor the server hardware, the server's SQL application software, the server's middleware, the server's network connections, and the server's operating system.

The number and complexity of potential failure paths ramp up quickly when configuring APM technology in a highly redundant, high-availability computing environment. Each high-availability component may have multiple layers that may each be capable of failing independently or of triggering the failure of a dependent layer or component. Because a high-availability environment may require multiple instances of each component, an APM system that attempts to detect all possible combinations of failures of all layers of all instances of all components may have be faced with a huge number of potential failure paths. It is thus impractical for current APM technology to monitor and test all possible combinations of failures in a high-component-count implementation, or in other types of complex environments that comprise a large number of monitored components.

Even if a system administrator were to manually constrain an APM system to monitor only a tiny subset of all possible failure paths, that subset would likely be selected as a function of technical factors, such as known failure rates of certain classes of components. This would result in a performance-management configuration that prioritizes the performance of a component as a function of the component's past vulnerability to failure, not as a function of the business criticality of the service that the component supports.

SUMMARY

Embodiments of the present invention comprise methods, systems, and computer program products that provide cognitive analytics for high-availability application-performance management (APM). An application-performance management system manages the performance of a service that is configured to run on a highly redundant high-availability platform that provides duplicate instances of hardware, software, and infrastructure components. The APM system validates the resilience of the platform by conducting a series of tests that each measure the performance of platform components while simulating a failure path comprising failures of one or more platform components or layers of the platform components. If the service is not highly critical, the APM system simulates single-failure failure paths, but more critical services are validated by simulating failure paths that comprise multiple simultaneous failures. Self-learning cognitive modules of the APM system select the failure paths to be simulated and then infer from the resulting measurements which failure paths present an unacceptably high risk of service outage. The APM system then directs downstream systems to revise the architecture to mitigate any such risks.

DETAILED DESCRIPTION

Figure 1:
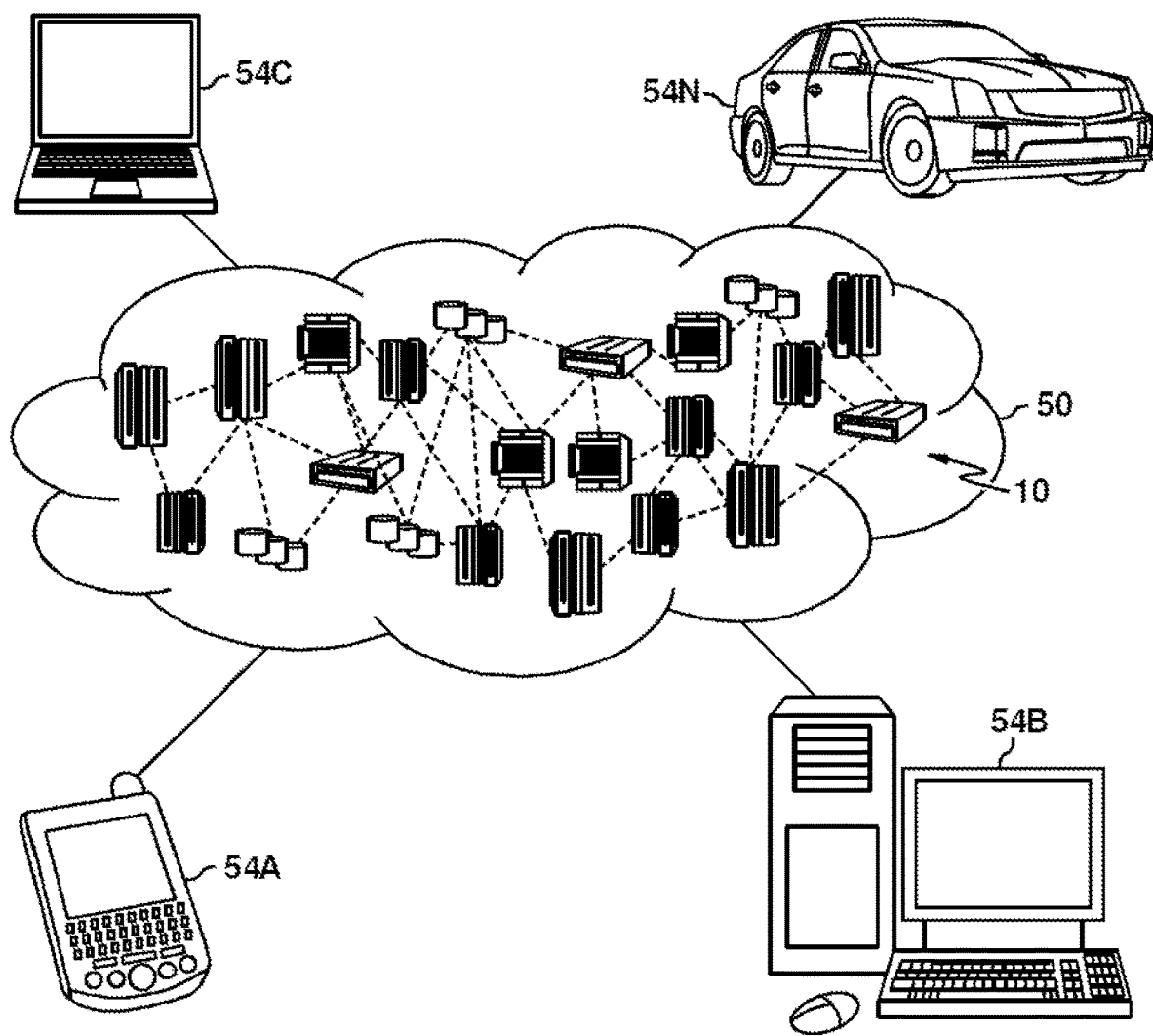
FIG. 1 depicts a cloud computing environment according to an embodiment of the present invention.

An information-technology (IT) architecture can attempt to ensure the high availability of a critical business service by configuring redundant instances of hardware, software, middleware, and network components, or of entire systems or subsystems. If one instance of a component or system fails, a duplicate instance can automatically substitute (or "failover") to provide at least a portion of the compromised function or service.

Even redundancy, however, cannot always guarantee the uninterrupted service required by a high-availability application, especially when the service requires interoperation of redundant components that span multiple systems or domains. In such cases, the additional redundant components actually increase the difficulty of managing application performance by greatly increasing the total number of possible failures (and possible combinations of concurrent failures) capable of causing an outage. And when components or systems are closely coupled, even a seemingly minor, isolated failure can trigger other failures that cascade into a major outage.

This document defines a "failure path" as a set of conditions or component failures capable of compromising a service or contributing to an outage. In some cases, a failure path can include simultaneous failures of multiple systems, subsystems, components, and component layers. Legacy APM technology could be significantly improved by a way to associate each possible failure path with a service's relative degree of vulnerability to outage.

Time and resource constraints permit legacy APM technologies to at best weakly address these issues. For example, a service that comprises several hundred interoperating multi-layer components would require tens, or even hundreds, of thousands of tests to evaluate all possible failure paths.

Because it is impractical for existing APM technology to routinely monitor so many possible combinations of test points, current APM systems treat services, systems, or major modules as black boxes, merely comparing each box's overall workload to its overall output. There is thus no way for known APM systems to determine, for example, that a service outage is being caused by an operating-system failure on a server hosting an application required by the service. All that a current system can do is notify an operator or supervising system that the service's performance has been compromised.

It is burdensome, although theoretically possible, to configure a legacy APM system to monitor one or more particularly unreliable components, systems, subsystems, or layers in isolation. It can be more challenging to identify failure paths most likely to create an outage in a critical service. This is especially true for failure paths that comprise multiple, closely coupled failures of components in a service or a system that comprises a great deal of redundancy. When a service depends upon the interaction of numerous hardware, software, middleware, and network subsystems, there may be no straightforward way to identify which combinations of failures are most likely to create an outage. Similarly, there is no straightforward way to direct an APM system to monitor failure paths most directly connected with outages of a critical service.

Existing systems may be able to measure performance along only a handful of all possible failure paths and generally do not consider multiple-component failures capable of causing an outage. Because a measurement point may be manually selected by a human administrator, the extent of a test performed on a particular service does not always correlate with the relative criticality of the tested service. That is, current APM technology generally determines how comprehensively to monitor a component as a function of technical constraints, rather than business priorities. Current APM technology also fails to verify failover and failback functions, which attempt to mitigate the adverse effect of an outage by automatically switching a compromised service to redundant components.

Known APM systems would benefit from such functionality because knowledge of each failure mode's relative impact would allow those systems to be configured to more accurately identify and monitor the occurrence of each failure path capable of creating a critical service outage.

Embodiments of the present invention provide an organized, effective, and efficient way to identify important failure paths when designing high-availability architecture for an APM framework. Such embodiments simulate numerous failure paths that each comprise a failure of one or more layers of one or more systems, components, or sub-components that support the managed application or service. Some implementations may test every possible failure path when such a methodology is warranted, such as when a service is deemed to be critical to a business. But in other cases, an embodiment may, through a method of artificially intelligent cognitive analytics, intelligently select only paths that include certain combinations of concurrent failures. Yet other embodiments may perform single-failure tests, but may test one layer of every instance of every component. In all cases, the selected failure paths may be chosen so as to produce failure states deemed to be representative of failures most likely to disrupt critical business services.

Some embodiments may be used to improve the operation of an APM system during actual operating in a production environment. In such cases, a self-learning cognitive-analytics module reviews records and logs of past system failures in order to continuously learn how to revise the APM framework to better monitor the most critical services.

Even if it is not possible for an embodiment of the present invention to regularly test all possible failure modes of a high-availability system, repeated attempts to test subsets of the full set of possible modes allow the system's cognitive analytics to identify those failure modes most likely to interrupt a high-availability service.

In other words, benefits provided by the present invention's improvements to existing APM technology fall into two categories:

i) quality, resilience, and effectiveness improvements that maintain the integrity of an APM system throughout the APM system's entire lifecycle, including design, implementation, testing, production, and maintenance phases These improvements help ensure that the APM system has been optimized to manage high-availability services before the system is placed into production by identifying vulnerabilities and unacceptably high probabilities of failure associated with certain combinations of component failures. These improvements also allow the system to be re-evaluated when taken offline for scheduled maintenance, or when a managed high-availability service or operating environment has undergone a revision that affects the service's or environment's expected workload, performance, topology, or other functional or nonfunctional characteristics.

ii) granularity and scalability improvements that allow the APM system to identify outage vulnerabilities related to concurrent failures of hardware/software layers in any system or component that supports a high-availability managed service. Furthermore, integrating these improvements into existing APM technology provides holistic benefits if the APM technology already supports complementary functionality, such as the ability to monitor a managed service's key performance indicators (KPIs).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
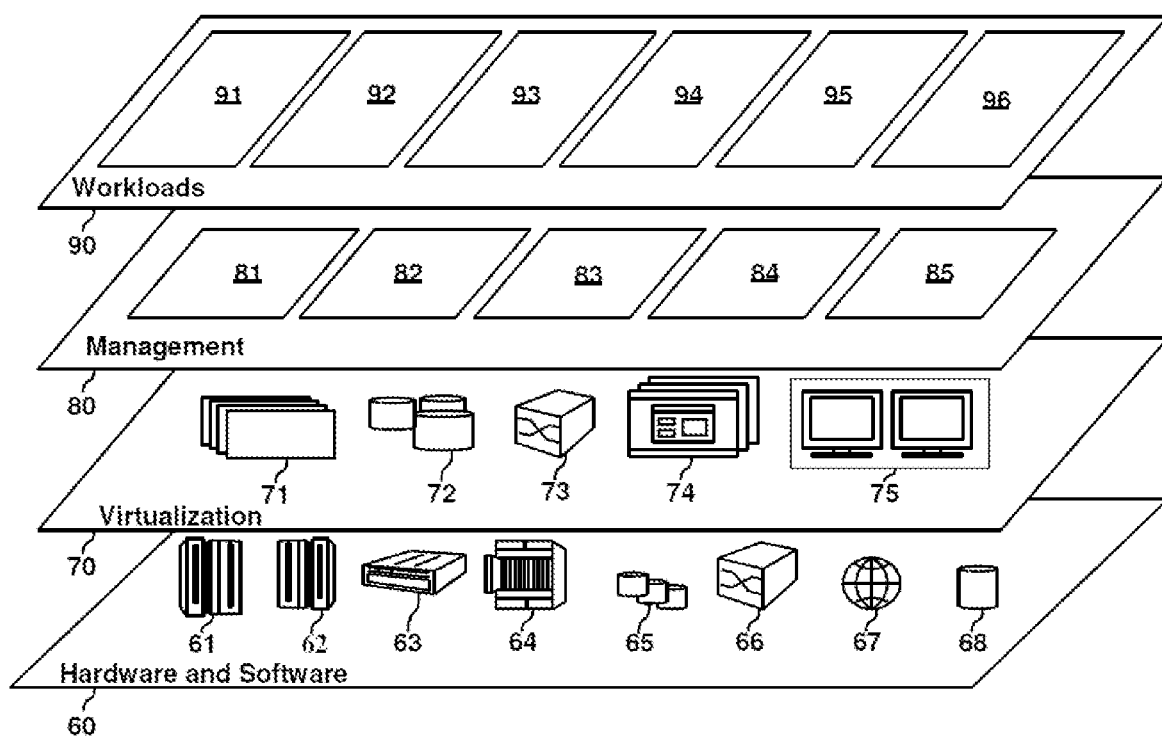
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of cognitive analytics for high-availability application-performance management.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
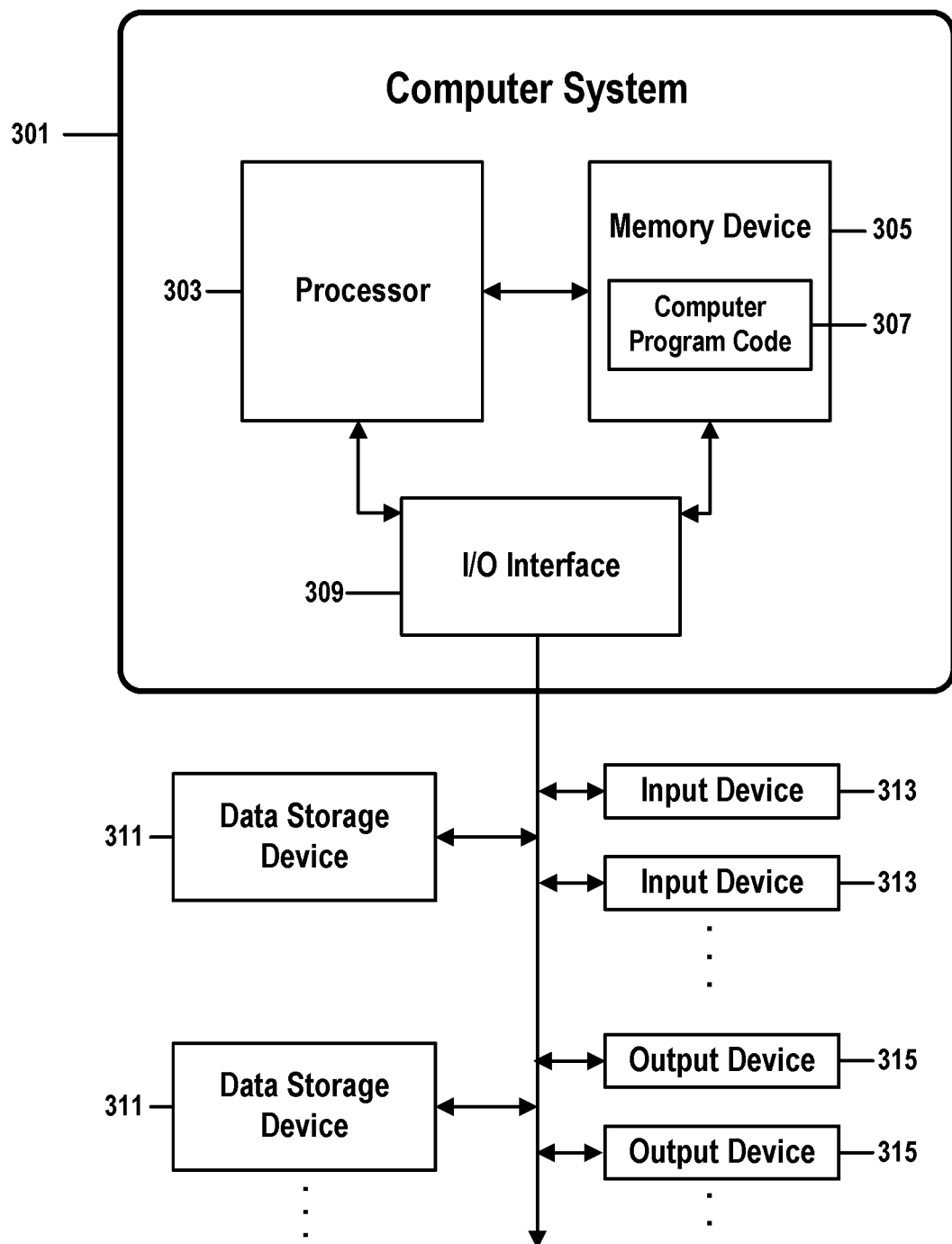
FIG. 3 shows the structure of a computer system and computer program code that may be used to implement a method for high-availability application-performance management in accordance with embodiments of the present invention.

FIG. 3 shows a structure of a computer system and computer program code that may be used to implement a method for high-availability application-performance management in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for high-availability application-performance management in accordance with embodiments of the present invention, and may implement other embodiments described in this specification, including the methods illustrated in FIGS. 1-9. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for high-availability application-performance management.

Any of the components of the present invention could be created, integrated, hosted, maintained, deployed, managed, serviced, supported, etc. by a service provider who offers to facilitate a method for high-availability application-performance management. Thus the present invention discloses a process for deploying or integrating computing infrastructure, comprising integrating computer-readable code into the computer system 301, wherein the code in combination with the computer system 301 is capable of performing a method for high-availability application-performance management.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for high-availability application-performance management may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for high-availability application-performance management is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
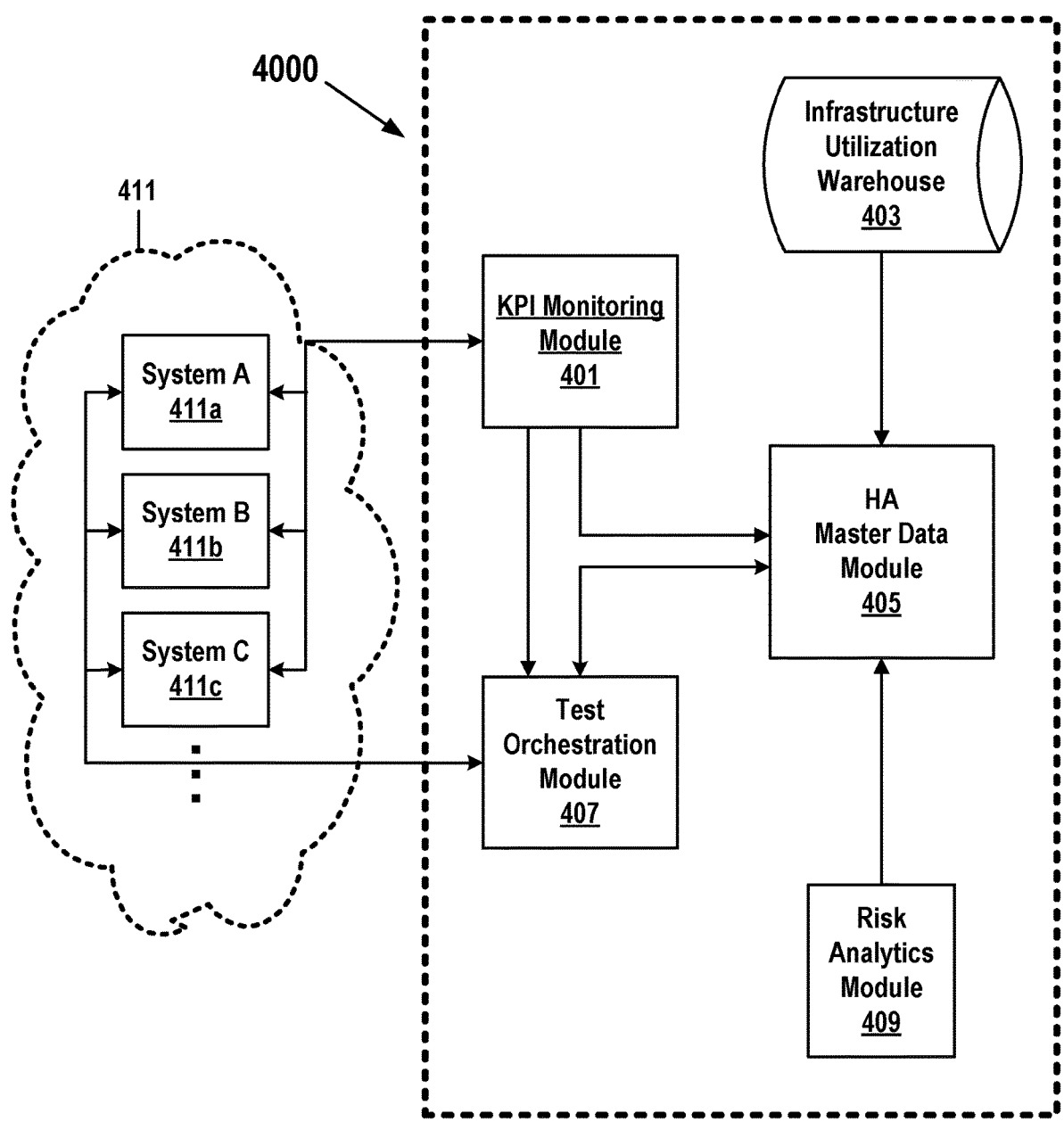
FIG. 4 shows a structure of an application-performance management system that may be used to implement a method for high-availability APM in accordance with embodiments of the present invention.

FIG. 4 shows a structure of an application-performance management (APM) system 4000 that may be used to implement a method for high-availability APM in accordance with embodiments of the present invention. FIG. 4 show items 401-411c and 4000 which may be implemented in embodiments that incorporate the platforms of FIGS. 1-3.

APM system 4000 shows components of an improved application-performance management system that monitors and manages the performance of one or more services or applications implemented as systems 411a-411c. Although FIG. 4 shows systems 411a-411c as being implemented as cloud resources provisioned in a cloud-computing environment 411, this exemplary representation should not be construed to limit embodiments of the present invention to cloud-hosted resources. Other embodiments may apply the algorithms, technologies, and other improvements of FIGS. 5-7 to the management of systems, services, and applications running in one or more other types of high-availability computing environments.

APM system 4000 comprises the following modules:
- a test orchestration module (TOM) 407 that performs performance tests that each simulate a failure path of the one or more services or applications;
- a KPI monitoring module (KMM) 401, which monitors key performance indicators (KPIs) that measure performance characteristics of each system 411a-411c both during a performance test and during normal operation;
- a risk-analytics module (RAM) 409 that, using cognitive and statistical methods based on test results and on each system's, component's, and layer's past outage, utilization, and overload statistics (such its historical mean time between failures (MTTF) and mean time to repair (MTTR), intelligently assigns a probability of failure (or unavailability) score to each layer of each component of each system 411a-411c; RAM 409 may also use analytics to perform other cognitive operations, such as making a layer-combinations recommendation that selects a particular combination of component layers to test concurrently;

an infrastructure utilization warehouse (IUW) 403 that records utilization rates of processors, computer memory, storage devices, and other system components during both during performance testing and during normal operation;

a high-availability master data module (HA MDM) 405 that coordinates testing procedures performed by TOM 407 and monitored by KMM 401 with information stored in infrastructure utilization warehouse 403 and with the output of analytics module 409.

Figure 8:
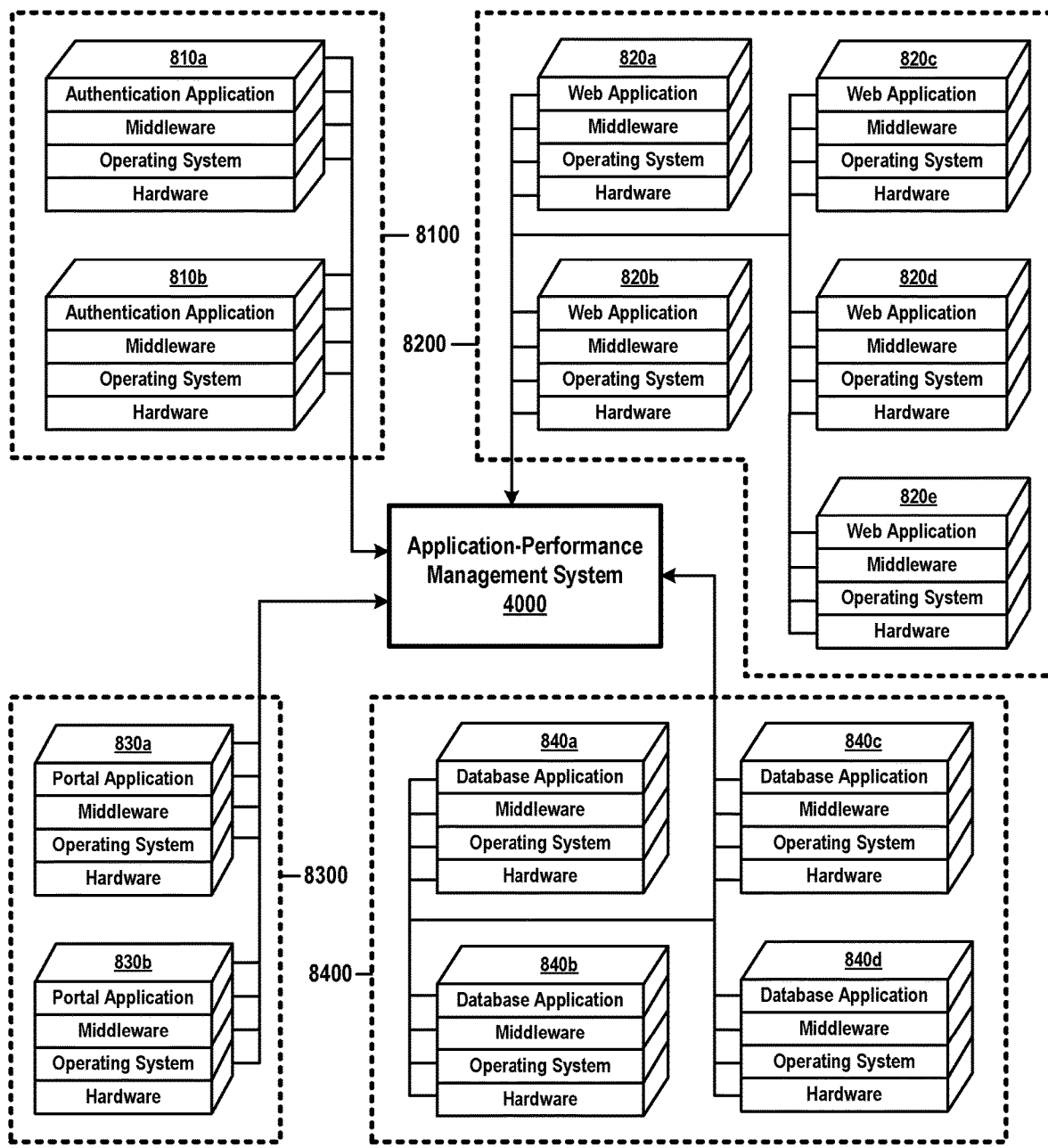
FIG. 8 shows components and layers of a high-availability service managed by the improved application-performance management system of the present invention.

FIG. 8 shows details of a high-availability service that, like systems 411a-411c, is managed by the improved application-performance management system of the present invention. FIG. 8 comprises items 810a-840d, 4000, and 8100-8400.

In the example of FIG. 8, the managed service consists of four systems: an authentication application 8100, a web application 8200, a portal application 8300, and a database application 8400. Each system 8100-8400 is organized into a four-layer stack: an application layer, a middleware layer, an operating system layer, and a hardware layer. Any combination of systems 8100-8400 may be treated as an example of the systems 411a-411c of FIG. 4.

The service is implemented in a high-availability configuration, in which each system 8100-8400 contains redundant instances of each node. Authentication application system 8100 contains two identical redundant nodes 810a and 810b. Web application system 8200 contains two identical redundant nodes 820a and 820b. Portal application system 8300 contains two identical redundant nodes 830a and 830b. And database application system 8400 contains two identical redundant nodes 840a and 840b.

During a test procedure, improved APM system 4000 accesses each tested layer of each node 810a-840d. As will be explained in FIGS. 5-7, APM system 800 may choose to run either a single-failure test that measures performance when inducing a failure in one layer of one node, or may run a multi-failure test that measures performance when inducing simultaneous failures in multiple layers of one or more nodes. APM system 4000 comprises modules 401, 403, 405, 407, and 409 of FIG. 4.

Probability of Failure, or unavailability, of a layer of a component of a system 411a-411c may be expressed in any manner preferred by an implementer. For example, a layer's unavailability may be expressed as a decimal value between 0 and 1, where 0 indicates guaranteed full-time availability and an unavailability value of 1 indicates that the layer is never available.

In another example, unavailability may be expressed as a function of a layer's historic mean time between failures (MTBF) and mean time to repair (MTTR), such as:

$$\text{Unavailability} = 1 - (MTBF/(MTBF+MTTR))$$

In this example, embodiments may derive unavailability values for a particular layer or component in any manner known in the art, including combinations of:
actual observed values of MTBF and MTTR,
baseline values of MTBF and MTTR accepted by convention throughout the industry, and
specification MTBF and MTTR values provided by vendors that provide hardware or software that make up the layer.

Figure 5:
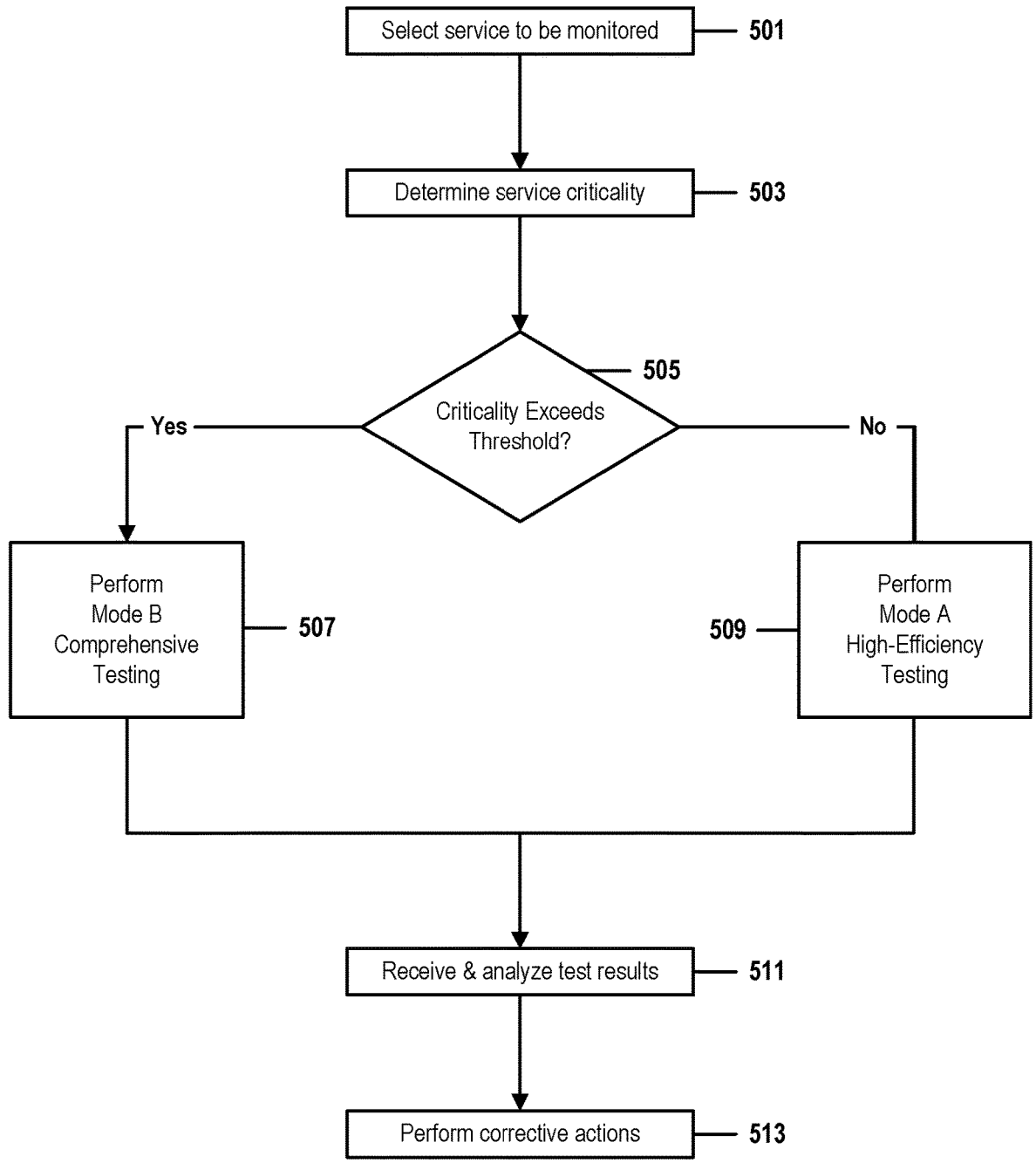
FIG. 5 is a flow chart that shows steps of a method for high-availability application-performance management in accordance with embodiments of the present invention.

FIG. 5 is a flow chart that shows steps of a method for high-availability application-performance management in accordance with embodiments of the present invention. FIG. 5 refers to objects 501-513.

In step 501, master data module 405 of APM system 4000 selects or identifies a service or application to be tested. This selection may be performed by any means known in the art, such as by a manual notification by a human operator or by an intelligent selection made by a cognitive component of the master data module 405.

In embodiments shown in FIG. 5, the selection may be performed intelligently by a cognitive analytics module that has been seeded with a listing of applications or services that fall within the scope of APM system 4000.

In step 503, master data module 405 determines the relative criticality level of the selected service or application. This determination may be made by any means known in the art, such as by lookup into a table or database, by analysis of recorded technical information (such as a system's topology, function, scope, or other technical characteristic), by manual input by a human or computerized expert, or by means of inferences drawn from logged performance records.

Similarly, the present invention is flexible enough to encompass any method of representing the relative criticality that is preferred by an implementer. For example, in one embodiment, an implementer would define five levels of service criticality as a function of how severely a disruption of that service would affect important business goals:

Level 5: a failure would create a risk of serious personal injury or death

Level 4: a failure would affect the operating costs, revenues, or stability of an entire enterprise Level 3: a failure would affect the operating costs, revenues, or stability of an entire domain of the enterprise Level 2: a failure would affect the operating costs, revenues, or stability of a sub-domain of the enterprise Level 1: adverse effects of a failure could be mitigated by an automatic substitution of a similar service.

Figure 9:
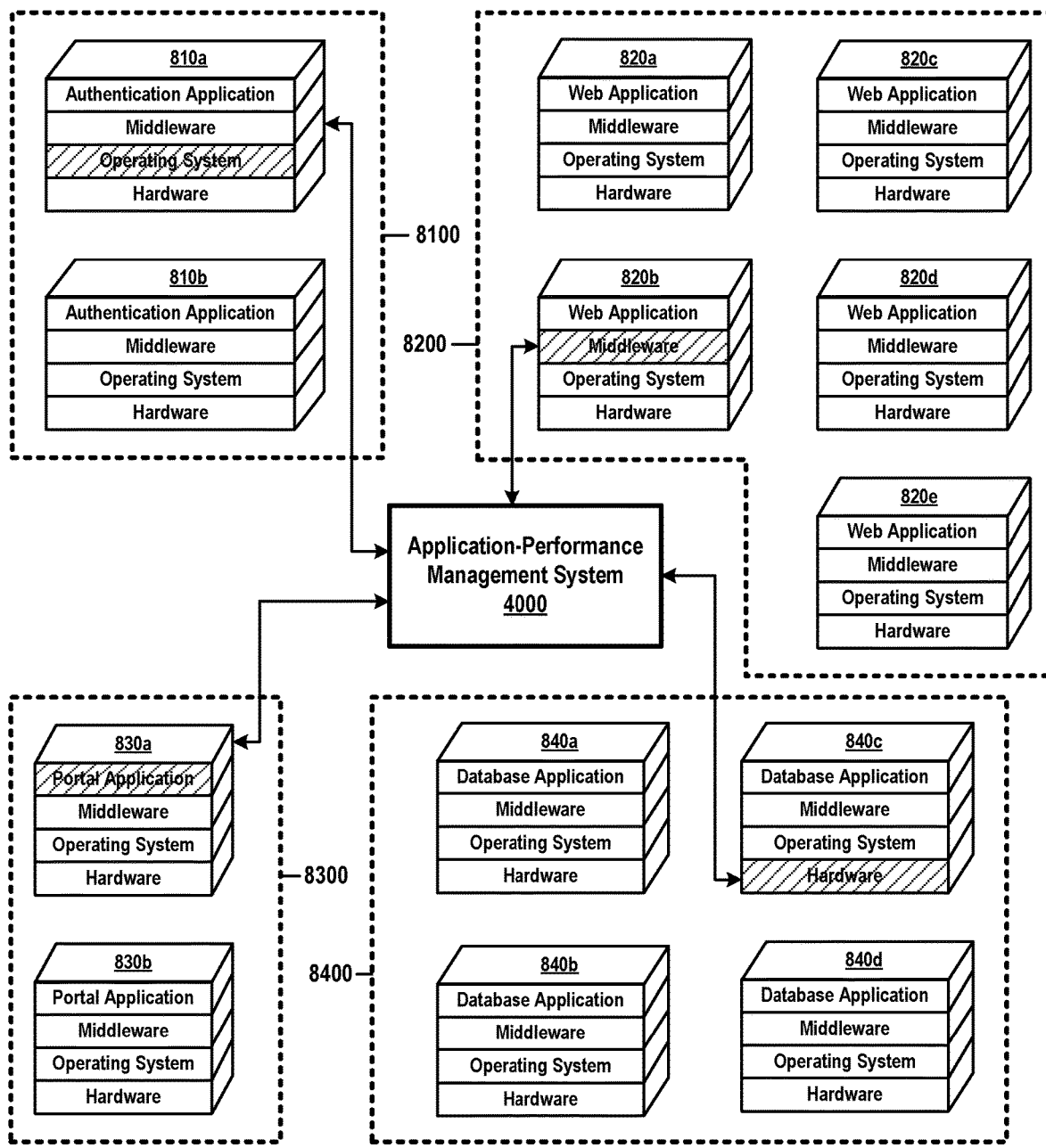
FIG. 9 shows the components and layers of the high-availability service of FIG. 8, annotated to identify layers comprised by an exemplary failure path.

In step 505, master module 405 determines whether the criticality identified in step 503 exceeds a predetermined threshold value. If the criticality level exceeds the threshold, then the system in step 507 performs a comprehensive "Mode B" testing strategy that tests failure paths comprising multiple concurrent failures. This Mode B testing procedure is described in greater detail in FIG. 7. If the criticality level does not exceed the threshold, then a more efficient "Mode A" single-failure testing strategy is performed in step 509. This Mode A testing procedure is described in greater detail in FIG. 6. FIGS. 8 and 9 provide further examples of the differences between Mode A and Mode B testing.

The threshold value may be set by an implementer as a function of expert knowledge of a business's goals, operations, or policies. For example, a healthcare business may maintain an internal policy designating as mission-critical any service that directly affects a patient's physical well-being. In the previous example, such a business would select a threshold of level 4, indicating that any service associated with a criticality level greater than 4 would be given preferential treatment.

Regardless of whether the system performs a Mode A test procedure or a Mode B test procedure, each test is orchestrated by test-orchestration module 407, which induces failures in each layer or component comprised by the failure path under test. The results of the test, which are captured by KPI monitoring module 401, may comprise measurements of the overall performance, throughput, outage occurrences, overload conditions, resource unavailability, or other key performance indicators of the operational layers or components of the managed service under test. During these procedures, the operations of KPI monitoring module 401 and test-orchestration module 407 are managed by high-availability master data module 405.

In step 511, master data module 405 forwards the results of the testing procedures performed in step 507 or 509 to risk analytics module (RAM) 409, which has been initialized with data that allows RAM 409 to infer semantic meaning from the received results. For example, in the example of FIG. 4, this data might include MTBF and MTTR values of each layer and component comprising the managed service under test. These results may, for example, indicate that a critical service is particularly vulnerable to disruption by the occurrence of a particular set of concurrent failures.

RAM 409 then uses its rules engine or other cognitive mechanism to infer a probability of failure or unavailability value to each layer of each node under test. These values are returned to the HA master data module 405, which in turn forwards the results to another module of APM system 4000, or to a downstream application or administrator, that is capable of revising the topology of the high availability environment.

For example, if the master data module 405 has received information showing that a middleware layer of nodes 810a and 810b system 8100 exhibit unacceptably high unavailability during an unacceptably high number of failure paths, then the downstream system might respond by provisioning additional instances of nodes 810a and 810b in order to provide greater redundancy for what appears to be a vulnerability in the high-availability architecture.

In step 513, APM system 4000 takes corrective action, if needed, to address any unacceptably high probabilities of failure received or inferred in step 511.

As suggested above, for example, if the test results indicate that a particular combination of two component failures could cause the system to completely fail, the system might respond by increasing the number of redundant instances of those two components, or by revising the high-availability topology to reduce a critical dependency between the two components.

Embodiments of the present invention may further use methods of cognitive analytics to intelligently predict which corrective actions are most likely to rectify or mitigate vulnerabilities identified by the testing of step 507 or 509. These methods may use stored rulebases to draw upon inferences generated by correlating and analyzing utilization rates retrieved from the infrastructure utilization warehouse 403, KPI values retrieved by the KPI monitoring module 401 during the test procedures, probability-of-failure values derived by the risk analytics module 409, historical or archived KPI and utilization values logged during normal operation of the service prior to the commencement of testing, and other extrinsic and intrinsic information that characterizes the vulnerability of the service to various types of failures and disruptions.

In some embodiments, the measured KPI values or inferences drawn from the measured KPI values may be used to train the self-learning cognitive components of APM system 4000. Subsequent training sessions that incorporate this information into a training corpus can, for example, teach the cognitive components that a first combination of failures produces results that are far less likely to disrupt the managed application than would a second combination of failures, or that a third combination of failures results in a critical module's utilization rates rising to levels that exceed the acceptable range of utilization figures for that module. Such training could also teach the APM system 4000 that the high-availability platform must be revised in order to minimize vulnerabilities that currently exist when the second or third combination of failures occurs.

If the method of FIG. 5 is performed during the initial design or testing of the high-availability environment, APM system 4000 in step 513 may interact with a compatible topology-generating application to automatically revise the topology. If the method of FIG. 5 is performed during actual operation of the high-availability environment, APM system 4000 in step 513 may interact with a compatible system-management technology to automatically implement all or some of these revisions that may be performed without human interaction.

For example, if a revision requires additional instances of virtual machines to be provisioned in a cloud-computing environment, APM system 4000 could automatically interface with a cloud-management platform to provision those machines. In cases in which human intervention is necessary—such as when a revision requires the installation of physical hardware—APM system 4000 can direct a downstream network-maintenance utility (or the system's own user interface) to notify appropriate personnel that such hardware revisions have been found to be necessary to ensure high availability.

Figure 6:
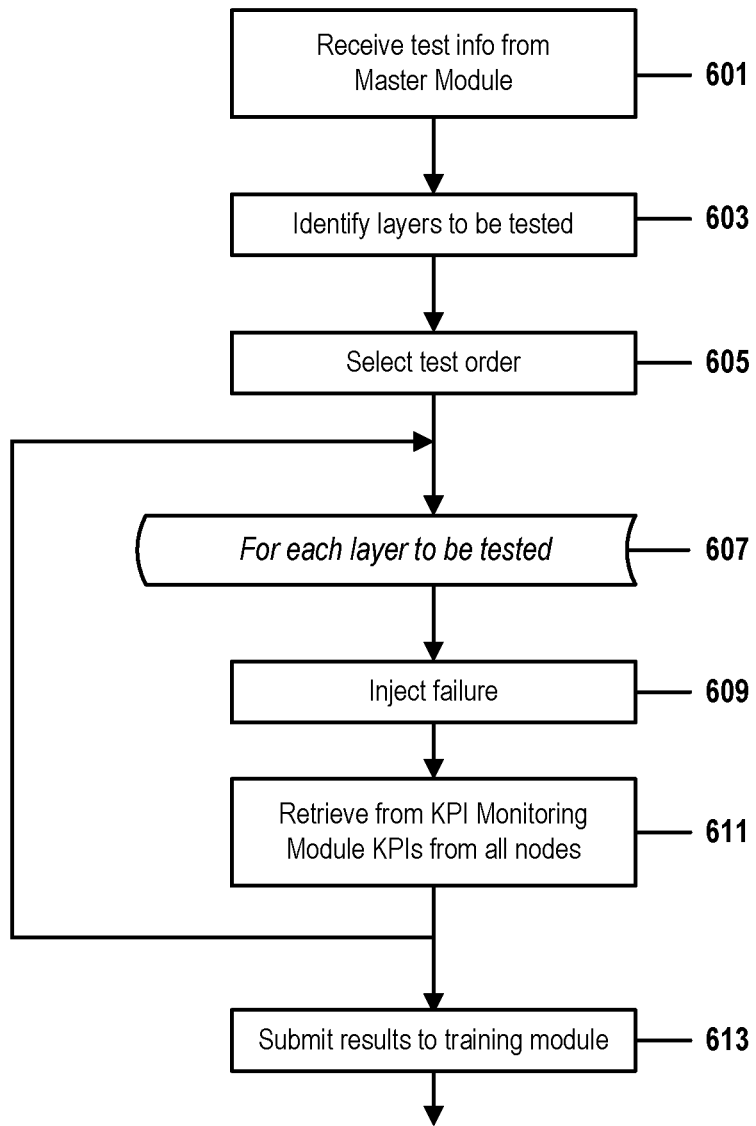
FIG. 6 is a flow chart that shows details of a higher-efficiency Mode A testing procedure for high-availability application-performance management in accordance with embodiments of the present invention.

FIG. 6 is a flow chart that shows details of a higher-efficiency Mode A testing procedure for high-availability application-performance management in accordance with embodiments of the present invention. FIG. 6 refers to objects 601-613 and elaborates upon step 509 of FIG. 5.

Mode A test procedures comprise single-failure testing in which each test involves inducing or simulating a failure in one layer of one node of one system comprised by the managed service, and then monitoring the effect of that failure on key performance indicators of all other layers or components comprised by the managed service.

In step 601, HA master data module (MDM) 405 forwards test information to testing orchestration module (TOM) 407. This information may include the service criticality level of the service to be managed, previously derived probabilities of failure or unavailability values associated with each system component layer, and a listing of system component layers included in each failure path to be tested.

In some embodiments, TOM 407 may also receive other system information, such as the topology of the systems, components, and network infrastructure to be tested; previously recorded processor, storage, and memory utilization figures and I/O rates of network components and storage devices; and other technical data capable of facilitating performance of the Mode B testing.

The received information may collectively define baseline performance of each component layer comprised by the managed service.

In step 603, if TOM 407 has not already received a list of system component layers to be tested, TOM 407 in this step identifies those layers. This identification may be performed by any means known in the art, such as by merely selecting layers that have the highest probability of failure, or by using cognitive analytics to select layers that occupy critical-path positions in the managed service's topology. In the latter case, TOM 407 would select a layer if that layer is configured such that its failure would cripple or disrupt a critical element of the managed service.

In some embodiments, one layer is selected from each node instance comprised by a system of the managed service. For example, in the exemplary systems of FIG. 8, TOM 407 in this step might test the operating system layers of nodes 810a and 810b of system 8100, the middleware layers of nodes 820a-8203 of system 8200, the application layers of nodes 830a and 830b of system 8100, and the hardware layers of nodes 840a and 840b of system 8400.

In certain embodiments, it may be possible to operate a particular node layer in more than one mode. Testing such a layer would then require more than one test pass. For example, if the hardware layers of system 8400 can assume two possible modes of operation during normal provision of the managed service, then testing such a layer would require two iterations of the procedure of steps 607-611, each of which induces a different mode-specific failure in the hardware layer of node 840a, 840b, 840c, or 840d.

Other embodiments may comprise other methods of selecting which layers are to be tested. The present invention is flexible enough to accommodate any layer-selection methodology known in the art that is desired by an implementer.

In step 605, if TOM 407 has not already received a listing of the order in which Mode A tests are to be performed, TOM 407 in this step selects a test order. In some embodiments, this selection may be performed in an arbitrary manner, may follow a predetermined schedule that allows testing to be performed in a way that minimizes impact on other systems or services, or may be inferred through a method of cognitive analytics. In some embodiments, the order or sequence of Mode A tests is not important when each test involves independent test conditions that do not affect the performance or results of other tests.

Step 607 begins an iterative procedure of steps 607-611, which is performed once for each Mode A test of one layer. As stated above, each Mode A test simulates a single-layer failure path in which one layer of one node instance of one system has failed.

In step 609, a failure is induced in the selected layer. For example, if the currently tested failure path comprises a failure of the operating-system layer of node 810b, TOM 407 would in this step disable, isolate, or otherwise disrupt the functions of the operating system running on node 810b.

TOM 407 will subject the managed service to real-world workloads and operational conditions during the duration of this test. For example, if a service handles, on average, 1,000 transactions per hour during normal production operation, TOM 407 would induce the failure while submitting an equivalent number of transactions to the service. In some embodiments, TOM 407 may, if desired by an implementer, instead inject a larger or smaller workload during the test period, in order to determine the service's behavior when a failure occurs while the service is under a negligible workload or a relatively heavy workload or when the service is already working to capacity.

In step 611, TOM 407 retrieves from KPI Monitoring Module 401 values of key performance indicators recorded by KPM 401 during the duration of the induced failure. These KPI values characterize the performance of each node instance of each system comprised by the managed service, such as processor, storage, and memory utilization and I/O rates of network components and storage devices. In some embodiments, the KPI values are more finely granulated, characterizing the performance of each layer of each node.

These KPI values indicate which layers, nodes, and systems would be most adversely affected by a failure of the selected layer. This determination may be made by means of artificially intelligent cognitive analytics, but may also be made by other means known in the art. For example, a certain layer's KPI value recorded by KPI monitoring module 401 during the induced failure may be deemed to be unacceptably high if the measured value exceeds, by a predetermined percent, a known average historical value of the same layer's KPI. These known historical values may be retrieved from the infrastructure utilization warehouse 403 or from other extrinsic information sources, such as system logs.

At the conclusion of the final iteration of the procedure of steps 607-611, the APM system 4000 will have monitored and recorded the performance of every component or layer of the managed system during all single-failure failure paths of interest. The method of FIG. 6 then restores the managed system to normal operation and proceeds to step 613.

In step 613, APM system 4000 or master data module 405 of APM system 4000 optionally submits to a cognitive training module the results of the testing procedures. These results will be used by the training module to infer correlations between types of failure paths and the effect of those failures on the performance of the managed service. These correlations will be used to further train the cognitive components of APM system 4000 to better predict probabilities of failure, component and layer criticality, and other characteristics of the managed system associated with the managed system's reliability and resilience.

At the conclusion of step 613, the method of FIG. 6 returns control to step 511 of FIG. 5. The test results are then analyzed by means of cognitive analytics and forwarded to downstream systems to perform any required corrective actions. FIGS. 8 and 9 describe examples that compare the operation of FIG. 6's Mode A testing methodology with FIG. 7's Mode B testing methodology.

Figure 7:
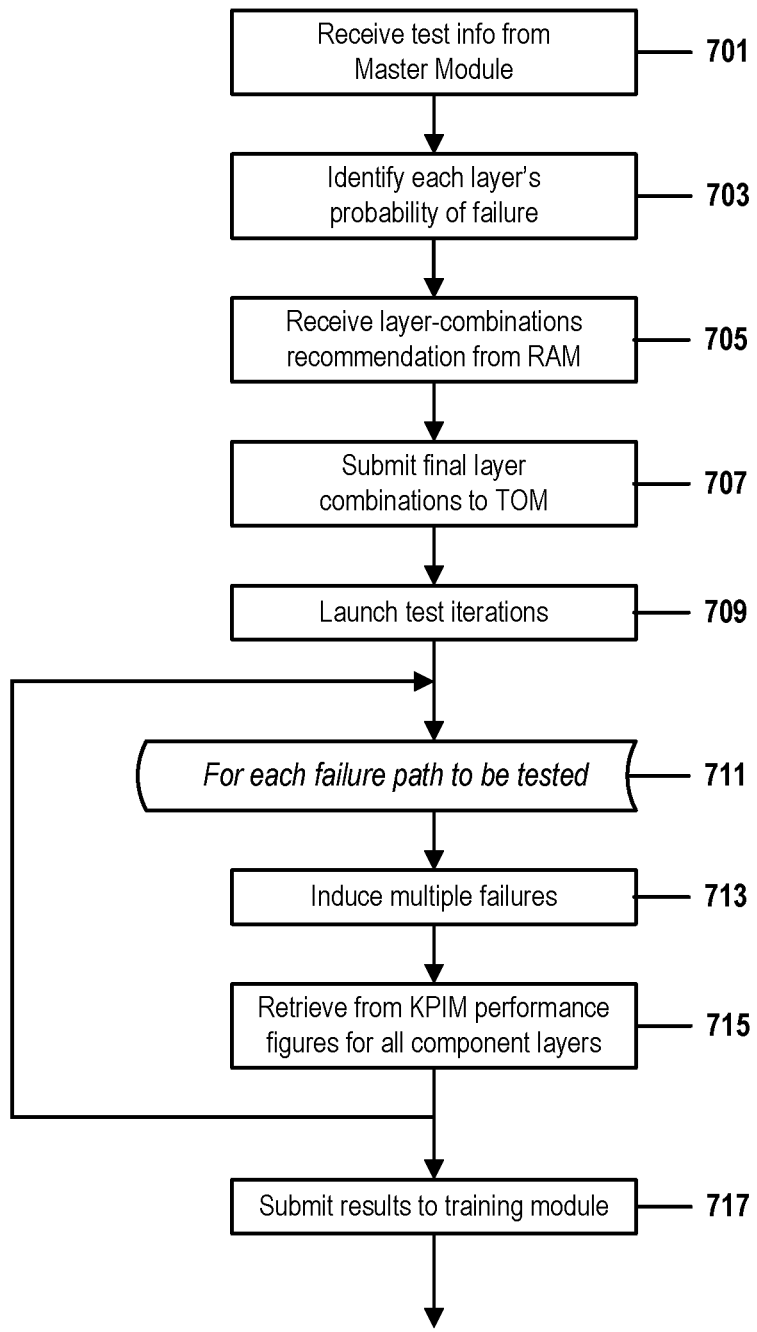
FIG. 7 is a flow chart that shows details of a more comprehensive Mode B testing procedure for high-availability application-performance management in accordance with embodiments of the present invention.

FIG. 7 is a flow chart that shows details of a more comprehensive Mode B testing procedure for high-availability application-performance management in accordance with embodiments of the present invention. FIG. 7 refers to objects 701-717 and elaborates upon step 507 of FIG. 5.

Like the Mode A tests of FIG. 6, a Mode B test induces failures in hardware or software layers of system components that provide a high-availability service, and then monitors the effect of the induced failures on the performance, throughput, or other KPIs of other layers of the system components. Both Mode A and Mode B testing methodologies then use inferential, artificially intelligent, rule-based cognitive analytics to infer a relative probability that the tested failure path will disrupt the high-availability and, if necessary, take corrective action to reduce that probability. Furthermore, a Mode B test procedure is similar in most other ways to the Mode A procedure described in FIG. 6.

Unlike Mode A testing, however, a Mode B procedure tests failure paths that comprise multiple concurrent failures that may span any layers of any components, rather than a single failure in one layer of one component. The examples of FIGS. 8 and 9 more directly compare Mode A and Mode B tests in greater detail.

In step 701, HA master data module (MDM) 405 forwards test information to testing orchestration module (TOM) 407. This information may include the service criticality level of the service to be managed, previously derived probabilities of failure or unavailability values associated with each system component layer, and a listing of system component layers included in each failure path to be tested.

In some embodiments, TOM 407 may also receive other system information, such as the topology of the systems, components, and network infrastructure to be tested; previously recorded processor, storage, and memory utilization figures and I/O rates of network components and storage devices; and other technical data capable of facilitating performance of the Mode B testing.

The received information may collectively define baseline performance of each component layer comprised by the managed service. In some embodiments, some or all of this data may have been retrieved from the infrastructure utilization warehouse (IUW) 403.

In step 703, if TOM 407 has not in step 701 already received a list of each layer's probability of failure, TOM 407 in this step requests and receives those probabilities from risk analytics module 405 or from another module of the APM system 4000. In some embodiments, these probability values may have been arbitrarily selected by a system designer as a function of the designer's expert knowledge of technical characteristics of systems 411a-411c, or may comprise initial values that will be iteratively refined by self-learning modules of APM system 4000. In other embodiments, the probability values will be based on past performance records of the components under test or of similar components or system configurations.

In step 705, if it has not yet done so already, TOM 407 receives from risk analytics module (RAM) 405 listings of the layers comprised by each failure path to be tested. These listings are derived by RAM 405 from various sources, including utilization data and historical performance logs stored in the infrastructure utilization warehouse (IUW) 403, known probabilities of failure, extrinsic logs, knowledge of human or computerized experts, industry statistics and records, and other internal and extrinsic sources.

Using cognitive analytics, RAM 405 infers from this information which combinations of component layers to test in order to configure a high-availability environment that minimizes the chance of outages to the managed service. Each test will induce concurrent failures in one combination and then measure the effect of that multiple failure on other components and layers that contribute to the managed service.

In some embodiments, the test orchestration module 407, HA master data module 405, or other component of APM system 4000 may, before launching the actual tests in step 709, revise or update the recommended failure-path layer combinations suggested by RAM 405. In some embodiments, APM system 4000 may also allow a human or artificially intelligent override or augment the recommended combinations derived by RAM 405.

In step 709, TOM 407 initiates the actual test procedures. Each test comprises one iteration of the procedure of steps 711-713 that tests one failure path. As mentioned above, each failure path tests the resilience of the managed service when one designated combination of failures occurs.

Step 711 begins the performance of one iteration of the iterative procedure of steps 711-713. This iterative procedure repeats once for each failure path identified in step 707.

When a highly available computing environment comprises multiple redundant instances of systems or system components, a failure path may be tested multiple times. For example, if system 8200 of FIG. 8 contains five identical redundant nodes 810a-810e, a failure path that specifies the middleware layer of these nodes must be tested five times in order to identify the effect of a failure in the middleware layer of any of the five nodes.

In step 713, TOM 407 induces failures in the combination of layers identified by the failure path currently being evaluated. These failures may be induced by any means known in the art. For example, a failure in an application layer may be induced by terminating an application running in that layer. Similarly, a failure in a hardware layer of a network component may be induced by disabling a port through which the network component communicates with other components or by assigning the network component a nonexistent IP address.

In step 715, the KPI monitoring module 401 measures key performance indicators (KPIs) of other layers and components of interest. These KPI measurements indicate performance characteristics of the measured layers and components, such as throughput, response time, CPU or memory utilization, or cache hit/miss ratios.

KPI monitoring module 401 then forwards the KPI measurements to the test orchestration module 407, master data module 405, or other relevant component of APM system 4000. In some embodiments, KPI measurements for one Mode B test iteration may be forwarded at the conclusion of each iteration of steps 711-715. In other embodiments, the KPI measurements for all test iterations may be forwarded en masse at the conclusion of the last iteration of step 711-715. As described in FIGS. 4-5, this information will ultimately be returned to master data module 405 or risk analytics module (RAM) 409 for further processing.

The KPI measurements identify the performance of every other component or layer of interest in the systems that implement the managed service, while the system is suffering from the simultaneous failure of all component layers comprised by the current failure path. In other words, these measurements characterize the effect that failures comprised by a particular failure path have on the availability of the high availability service. For example, if KPI measurements reveal that an application layer of database-query module of a critical database system can produce no output when a particular combination of failures occurs, that failure path will be interpreted as being a critical flaw in the configuration of the high-availability platform on which the database system is running.

At the conclusion of each iteration of steps 711-715, TOM 407 restores the current combination of layers to their normal, fully operational state.

In optional step 717, embodiments of the present invention forward the KPI measurements, or inferences derived from the KPI measurements, to a machine-learning training module that trains the cognitive components of system 4000 to better predict the results of each failure path. Subsequent training sessions that incorporate this information into a training corpus can, for example, teach the cognitive components that a first combination of failures produces results that are far less likely to disrupt the managed application than would a second combination of failures, or that a third combination of failures results in a critical module's utilization rates rising to levels that exceed the acceptable range of utilization figures for that module.

FIG. 9 shows the components and layers of the high-availability service of FIG. 8, annotated to identify layers comprised by an exemplary failure path. FIG. 9 comprises items 810a-840d, 4000, and 8100-8400, which are identical in form and function to similarly numbered items of FIGS. 4 and 8.

As in FIG. 8, FIG. 9 shows four systems 8100-8400 that together provide a high-availability service managed by APM system 4000. In this example, the managed service consists of four systems: an authentication application 8100, a web application 8200, a portal application 8300, and a database application 8400. Each component of system 8100, 8200, 8300, and 8400 is organized into a four-layer stack: an application layer, a middleware layer, an operating system layer, and a hardware layer.

The managed service is implemented in a high-availability configuration, in which each system 8100-8400 contains a cluster of redundant instances of each node. Authentication application system 8100 contains two identical redundant nodes 810a and 810b. Web application system 8200 contains two identical redundant nodes 820*a* and 820*b*. Portal application system 8300 contains two identical redundant nodes 830*a* and 830*b*. And database application system 8400 contains two identical redundant nodes 840*a* and 840*b*.

In the example of FIG. 9, the shading identifies a set of nodes that, if simultaneously failing, constitute a particular failure path to be tested. Here, that failure path consists of the operating system layer of node 810*a* or identical redundant node 810*b* of system 8100, the middleware layer of node 820*a*, 820*b*, 820*c*, 820*d*, or 820*e* of system 8200, the application layer of node 830*a* or 830*b* of system 8300, and the hardware layer of node 840*a*, 840*b*, 840*c*, or 840*d* of system 8400.

In addition, because this example includes hardware layers that have two independent modes of failure (such as a computational failure and a storage capacity failure), each hardware layer of system 8400 can give rise independently to two possible types of failures, each of which must be tested. The failure path under test, therefore, consists of five simultaneous failures. In other examples, hardware layers may have only one mode of failure.

During the Mode A test procedure of FIG. 6, improved APM system 4000 performs a set of single-failure tests that each induces a failure in one of the shaded layers in one node. For example, one iteration of step 609 of FIG. 6 would induce a failure in the operating system layer of node instance 810*a* of authentication system 8100 and then measure selected KPIs of other layers and nodes in systems 8100-8400. Similarly, a second iteration of step 609 of FIG. 6 would induce a failure in the operating system layer of redundant node instance 810*b* of system 8100 and then measure the effect of that failure on the rest of the nodes in systems 8100-8400.

Proceeding in this manner, two more Mode A tests would be produced by a third iteration of step 609 that induces a failure in the portal application layer of node instance 830*a* of portal application system 8300 and a fourth iteration that induces a failure in the portal application layer of node instance 830. Five more iterations each induce a failure of the middleware layer of a node of web-application system 8200, four iterations each induce a first type of failure in the hardware layer of one of the four nodes of database-application system 8400, and four iterations each induce a second type of failure in the hardware layer of one node of system 8400.

Performing the Mode A testing of FIG. 6 on the systems of FIG. 9 therefore requires 17 single-failure tests.

FIG. 7's Mode B multi-failure testing of the same failure path requires a far greater number of tests. A comprehensive Mode B test of this failure requires testing every possible five-failure combination consisting of one instance of each shaded layer.

For example, a first Mode B test would comprise, in step 713, inducing concurrent failures in:

i) the operating system layer of node 810*a* of system 8100, ii) the middleware layer of node instance 820*a* of system 8200, iii) the application layer of node instance 830*a* of system 8300, iv) a first mode of the hardware layer of node instance 840*a* of system 8400, and v) a second mode of the hardware layer of node instance 840*a* of system 8400.

Subsequent tests would induce failures in the same layers of other instances of these nodes. For example, a second Mode B test would induce concurrent failures in:

i) the operating system layer of node 810*b* of system 8100, ii) the middleware layer of node instance 820*a* of system 8200, iii) the application layer of node instance 830*a* of system 8300, iv) a first mode of the hardware layer of node instance 840*a* of system 8400, and v) a second mode of the hardware layer of node instance 840*a* of system 8400.

Similarly, eight more tests would cycle through the remaining four node instances of system 8200, inducing failures in the same layers of node instances:

| | | | | |
|---|---|---|---|---|
| 810a | 820b | 830a | 840a | 840a |
| 810a | 820c | 830a | 840a | 840a |
| 810a | 820d | 830a | 840a | 840a |
| 810a | 820d | 830a | 840a | 840a |
| 810b | 820b | 830a | 840a | 840a |
| 810b | 820c | 830a | 840a | 840a |
| 810b | 820d | 830a | 840a | 840a |
| 810b | 820d | 830a | 840a | 840a |

This test sequence would proceed in this manner until all possible combinations of:

one instance of the operating system layer of system 8100,
one instance of the middleware layer of system 8200,
one instance of the application layer of system 8300
one instance of the first hardware layer of system 8400, and
a second instance of the second hardware layer of system 8400.

In a high-availability platform configured with a large degree of redundancy, fully comprehensive testing of every possible multi-failure failure path can generate an enormous number of tests. For example, all possible combinations of one-layer failures in each system of FIGS. 8-9, where systems 8100-8400 contain, respectively, two, five, two, and four redundant node instances, include combinations of 10 possible layer failures in system 8100, 25 in system 8200, 10 in system 8300, and 20 in system 8400, yielding 10*25*10*20=50,000 possible failure paths. In real-world systems where the total number of systems, components, and layers can be much larger, fully comprehensive testing that evaluates every possible failure path can be orders of magnitude larger.

As explained in FIGS. 5 and 7, embodiments of the present invention significantly reduce the number of multi-failure tests. In Mode B testing, certain failure paths may be omitted if corresponding combinations of failures are known (or inferred by means of cognitive analytics) to be relevant only to non-critical characteristics of the managed service.

For example, in FIG. 9, where systems 8100-8400 contain, respectively, two, five, two, and four redundant node instances (and where there are two possible types of hardware failures), the total number of failure paths that induce failures only in the shaded layers=2*5*2*4*2=160.

In this manner, embodiments of the present invention can verify the high availability of a critical service by testing only a small subset of the total number of possible multi-failure failure paths. Even if it is impossible or impractical to determine the effect of every possible failure combination on the service's performance characteristics, the use of artificially intelligent cognitive analytics can identify a small subset of the total number of failure paths that are most likely to create vulnerabilities.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. An application-performance management (APM) system comprising a processor, a memory coupled to the processor, and a computer-readable hardware storage device coupled to the processor, the storage device containing program code configured to be run by the processor via the memory to implement a method for high-availability application-performance management, the method comprising:
   the APM system receiving a request to validate a high-availability platform for a managed service
      where the APM system is configured to manage the service, and
      where the platform is configured to increase availability of the service by providing redundant instances of hardware, software, or infrastructure components;
   the APM determining whether a relative criticality of the service exceeds a threshold value;
   the APM system selecting a test mode as a function of the determining,
      where determining that the relative criticality does not exceed the threshold value indicates that the APM system should perform Mode A testing, in which each test simulates a single failure in one component comprised by the platform, and
      where determining that the relative criticality does exceed the threshold value indicates that the APM system should perform Mode B testing, in which each test simulates multiple concurrent failures among components comprised by the platform;
   the APM system performing the selected testing by measuring key performance indicators of components comprised by the platform, where each measured indicator identifies whether one or more simulated failures has affected a performance of a measured component;
   the APM system using cognitive analytics to:
      associate the failures simulated by one or more of the tests with an unacceptably high probability that the service will suffer an outage,
      infer, from recorded mean-time-between-failures and mean-time-to-repair statistics of a first component of the platform, a relative probability of failure of a layer of the first component,
      identify, by comparing the key performance indicator measurements with the inferred relative probabilities of failure, the unacceptably high probability,
      select the corrective action most likely to reduce the unacceptably high probability,
      select component layers in which to simulate failure in each Mode A test, and
      select combinations of component layers in which to simulate failure in each Mode B test; and
   the APM taking corrective action to reduce the unacceptably high probability.

2. The system of claim 1, where each simulated failure simulates a failure of one layer of one component comprised by the platform.

3. The system of claim 2, where the one layer is selected from the group consisting of an application layer, a middleware layer, an operating system layer, and a hardware layer.

4. The system of claim 2,
   where a subset of the tests comprised by the Mode A test mode is associated with one layer of a corresponding first platform component, and
   where each test of the subset simulates a failure of the one layer in one instance of a set of redundant instances of the first platform component, such that the subset simulates failures of the one layer in every instance of the set of redundant instances.

5. The system of claim 2,
   where a subset of the tests comprised by the Mode B test mode is associated with a set of layers of corresponding platform components,
   where each instance of a first layer of the set of layers is comprised by a distinct instance of a corresponding first platform component, and
   where each test of the subset simulates, for each layer of the set of layers, a failure of one instance of that layer, such that the subset simulates all distinct failure combinations that comprise failures of one instance of every layer of the set of layers.

6. The system of claim 2, where a first key performance indicator of the measured key performance indicators identifies a performance characteristic of one layer of one instance of one component comprised by the platform.

7. The system of claim 1, where the corrective action comprises reducing the unacceptably high probability by directing a downstream system to revise a topology of the platform.

8. A method for high-availability application-performance management, the method comprising:
   an application-performance management (APM) system receiving a request to validate a high-availability platform for a managed service,
      where the APM system is configured to manage the service, and
      where the platform is configured to increase availability of the service by providing redundant instances of hardware, software, or infrastructure components;
   the APM determining whether a relative criticality of the service exceeds a threshold value;
   the APM system selecting a test mode as a function of the determining,
      where determining that the relative criticality does not exceed the threshold value indicates that the APM system should perform Mode A testing, in which each test simulates a single failure in one component comprised by the platform, and
      where determining that the relative criticality does exceed the threshold value indicates that the APM system should perform Mode B testing, in which each test simulates multiple concurrent failures among components comprised by the platform;
   the APM system performing the selected testing by measuring key performance indicators of components comprised by the platform, where each measured indicator identifies whether one or more simulated failures has affected a performance of a measured component;

the APM system using cognitive analytics to associate the failures simulated by one or more of the tests with an unacceptably high probability that the service will suffer an outage,
  where the APM system uses the cognitive analytics to:
    infer, from recorded mean-time-between-failures and mean-time-to-repair statistics of a first component of the platform, a relative probability of failure of a layer of the first component,
    identify, by comparing the key performance indicator measurements with the inferred relative probabilities of failure, the unacceptably high probability,
    select the corrective action most likely to reduce the unacceptably high probability,
    select component layers in which to simulate failure in each Mode A test, and
    select combinations of component layers in which to simulate failure in each Mode B test; and
the APM taking corrective action to reduce the unacceptably high probability,
  where the corrective action comprises reducing the unacceptably high probability by directing a downstream system to revise a topology of the platform.

9. The method of claim 8, where each simulated failure simulates a failure of one layer of one component comprised by the platform.

10. The method of claim 9,
where a subset of the tests comprised by the Mode A test mode is associated with one layer of a corresponding first platform component, and
where each test of the subset simulates a failure of the one layer in one instance of a set of redundant instances of the first platform component, such that the subset simulates failures of the one layer in every instance of the set of redundant instances.

11. The method of claim 9,
where a subset of the tests comprised by the Mode B test mode is associated with a set of layers of corresponding platform components,
where each instance of a first layer of the set of layers is comprised by a distinct instance of a corresponding first platform component, and
where each test of the subset simulates, for each layer of the set of layers, a failure of one instance of that layer, such that the subset simulates all distinct failure combinations that comprise failures of one instance of every layer of the set of layers.

12. The method of claim 9, where a first key performance indicator of the measured key performance indicators identifies a performance characteristic of one layer of one instance of one component comprised by the platform.

13. The method of claim 8, further comprising providing at least one support service for at least one of creating, integrating, hosting, maintaining, and deploying computer-readable program code in the computer system, wherein the computer-readable program code in combination with the computer system is configured to implement the receiving, the determining, the selecting, the performing, the using, and the taking the corrective action.

14. A computer program product, comprising a computer-readable hardware storage device having a computer-readable program code stored therein, the program code configured to be executed by an application-performance management system comprising a processor, a memory coupled to the processor, and a computer-readable hardware storage device coupled to the processor, the storage device containing program code configured to be run by the processor via the memory to implement a method for high-availability application-performance management, the method comprising:
  an application-performance management (APM) system receiving a request to validate a high-availability platform for a managed service,
    where the APM system is configured to manage the service, and
    where the platform is configured to increase availability of the service by providing redundant instances of hardware, software, or infrastructure components;
  the APM determining whether a relative criticality of the service exceeds a threshold value;
  the APM system selecting a test mode as a function of the determining,
    where determining that the relative criticality does not exceed the threshold value indicates that the APM system should perform Mode A testing, in which each test simulates a single failure in one component comprised by the platform, and
    where determining that the relative criticality does exceed the threshold value indicates that the APM system should perform Mode B testing, in which each test simulates multiple concurrent failures among components comprised by the platform;
  the APM system performing the selected testing by measuring key performance indicators of components comprised by the platform, where each measured indicator identifies whether one or more simulated failures has affected a performance of a measured component;
  the APM system using cognitive analytics to associate the failures simulated by one or more of the tests with an unacceptably high probability that the service will suffer an outage,
    where the APM system uses the cognitive analytics to:
      infer, from recorded mean-time-between-failures and mean-time-to-repair statistics of a first component of the platform, a relative probability of failure of a layer of the first component,
      identify, by comparing the key performance indicator measurements with the inferred relative probabilities of failure, the unacceptably high probability,
      select the corrective action most likely to reduce the unacceptably high probability,
      select component layers in which to simulate failure in each Mode A test, and
      select combinations of component layers in which to simulate failure in each Mode B test; and
  the APM taking corrective action to reduce the unacceptably high probability,
    where the corrective action comprises reducing the unacceptably high probability by directing a downstream system to revise a topology of the platform.

15. The computer program product of claim 14, where each simulated failure simulates a failure of one layer of one component comprised by the platform.

16. The computer program product of claim 15,
where a subset of the tests comprised by the Mode A test mode is associated with one layer of a corresponding first platform component, and
where each test of the subset simulates a failure of the one layer in one instance of a set of redundant instances of the first platform component, such that the subset simulates failures of the one layer in every instance of the set of redundant instances.

17. The computer program product of claim 15,
where a subset of the tests comprised by the Mode B test mode is associated with a set of layers of corresponding platform components,
where each instance of a first layer of the set of layers is comprised by a distinct instance of a corresponding first platform component, and
where each test of the subset simulates, for each layer of the set of layers, a failure of one instance of that layer, such that the subset simulates all distinct failure combinations that comprise failures of one instance of every layer of the set of layers.

* * * * *